United States Patent
Nakagawa

(10) Patent No.: US 12,227,199 B2
(45) Date of Patent: Feb. 18, 2025

(54) DRIVER ASSIST SYSTEM

(71) Applicant: TOYOTA JIDOSHA KABUSHIKI KAISHA, Toyota (JP)

(72) Inventor: Yuki Nakagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 195 days.

(21) Appl. No.: 18/129,198

(22) Filed: Mar. 31, 2023

(65) Prior Publication Data

US 2023/0311920 A1 Oct. 5, 2023

(30) Foreign Application Priority Data

Apr. 4, 2022 (JP) .................................. 2022-062642

(51) Int. Cl.
*B60W 50/14* (2020.01)
*B60W 30/095* (2012.01)

(52) U.S. Cl.
CPC ........ *B60W 50/14* (2013.01); *B60W 30/0956* (2013.01); *B60W 2050/146* (2013.01); *B60W 2554/4041* (2020.02); *B60W 2554/80* (2020.02); *B60W 2556/65* (2020.02)

(58) Field of Classification Search
CPC ............. B60W 50/14; B60W 30/0956; B60W 2554/4041; B60W 2556/65; B60W 2554/80; B60W 2050/146
USPC ....................................................... 340/435
See application file for complete search history.

(56) References Cited

U.S. PATENT DOCUMENTS

| 7,302,325 B2 * | 11/2007 | Kudo ..................... G08G 1/167 |
| | | 348/148 |
| 2012/0019375 A1 * | 1/2012 | Kataoka ................. G08G 1/166 |
| | | 340/439 |
| 2014/0180567 A1 * | 6/2014 | Fetsch .................... G08G 1/168 |
| | | 701/301 |
| 2017/0080952 A1 * | 3/2017 | Gupta .................... G08G 1/167 |
| 2017/0162053 A1 * | 6/2017 | Margalef Valldeperez ................ |
| | | G08G 1/164 |

FOREIGN PATENT DOCUMENTS

| JP | 2001-347853 A | 12/2001 |
| JP | 2016-224553 A | 12/2016 |

* cited by examiner

*Primary Examiner* — Kerri L McNally
(74) *Attorney, Agent, or Firm* — Dinsmore & Shohl LLP

(57) ABSTRACT

A driver assist system configured to assist a driver properly to operate a vehicle, even if positional information of the vehicle and information obtained from an external source have errors, and collection of the information is delayed. A controller comprises: a position detector that detects a position of the vehicle; an obstacle detector that detects a position of an obstacle; a distance detector that determines that the vehicle overtakes the obstacle; and an information provider that executes a first notification of existence of the obstacle until the distance detector determines that the vehicle overtakes the obstacle, and a second notification of the existence of the obstacle within an extra distance or for an extra period of time.

12 Claims, 6 Drawing Sheets

DRIVER ASSIST SYSTEM

CROSS REFERENCE TO RELATED APPLICATIONS

The present disclosure claims the benefit of Japanese Patent Application No. 2022-062642 filed on Apr. 4, 2022 with the Japanese Patent Office, the disclosure of which are incorporated herein by reference in its entirety.

BACKGROUND

Field of the Disclosure

Embodiments of the present disclosure relate to the art of a driver assist system configured to assist a driver to operate a vehicle easily by providing information around the vehicle to the driver utilizing communication technologies.

Discussion of the Related Art

JP-A-2001-347853 describes a display device that indicates road information about a traffic congestion and obstacles existing ahead of the vehicle to assist a driver to operate the vehicle. According to the teachings of JP-A-2001-347853, a current position of the vehicle is detected based on a GPS signal received by a GPS sensor, and the driver is notified of the road information about current position received from external information provider and the information about obstacles ahead detected by a radar. In a specific condition where it is necessary to look both sides such as a blind corner and an intersection where a traffic light is installed, the above-mentioned information is not indicated in the display.

JP-A-2016-224553, also describes a traffic information display system that indicates traffic information including information about a traffic accident on a driving route. According to the teachings of JP-A-2016-224553, if there is a stalled vehicle e.g., on the side of an expressway, an instruction to avoid the stalled vehicle is indicated in a display based on an emergency signal representing an existence of the stalled vehicle received from a leading vehicle. In this situation, specifically, a triangular warning sign is projected three-dimensionally in a head-up display before reaching the stalled vehicle, and the triangular warning sign is emphasized in accordance with a speed, a running condition, and circumstances of the vehicle.

Thus, according to the prior art, a current position of the vehicle may be estimated based on the GPS signal received from a satellite. In addition, external information may be collected through a road-to-vehicle communication, and information about other vehicles may be collected thorough an inter-vehicle communication. The collected information may be provided to the driver to assist the driver to operate the vehicle. However, the collection of information through the road-to-vehicle communication and the inter-vehicle communication may delay inevitably, and the collected information may contain errors. For example, the GPS signal has an error caused depending on an atmospheric condition or positions of the satellites, and an error caused by a signal decay due to interference with a noise or other radio wave, or due to deficiency of received radio signals. In addition, a radio communication may also be delayed due to heavy traffic and existence of buildings blocking the radio communication. Thus, it is difficult to collect the information about other vehicles without delay and error during propulsion.

Specifically, according to the teachings of JP-A-2001-347853, the current position of the vehicle signal may not be obtained accurately through the GPS, and in addition, the collection of the information about the environment of the vehicle may be delayed depending on data traffic. If such misinformation about the current position of the vehicle is provided to the driver, and for example, a road on which the vehicle travels is frozen ahead of the vehicle, information about a frozen road surface would be disappeared from the display before reaching the frozen site. That is, the driver may not be assisted properly to prepare for the frozen site.

Likewise, according to the teachings of JP-A-2016-224553, a reception of the emergency signal from the leading vehicle may also be delayed by the above-explained reasons, and hence the triangular warning sign would be disappeared from the head-up display before reaching the stalled vehicle. If such information about the stalled vehicle ahead is not indicated properly on the head-up display, the driver may not be assisted properly to avoid the stalled vehicle.

SUMMARY

Aspects of the present disclosure have been conceived noting the foregoing technical problems, and it is therefore an object of the present disclosure to provide a driver assist system configured to assist a driver properly to operate a vehicle, even if the information about a current position of the vehicle and information obtained from an external source have errors, and collection of the information is delayed.

According to the exemplary embodiment of the present disclosure, there is provided a driver assist system that collects information about an obstacle located ahead of a vehicle, and that provides the information about the obstacle to a driver of the vehicle. In order to achieve the above-explained objective, according to the exemplary embodiment of the present disclosure, a controller of the driver assist system comprises: a position detector that detects a position of the vehicle; an obstacle detector that detects a position of the obstacle; a distance detector that determines that the vehicle overtakes the obstacle based on the position of the vehicle detected by the position detector and the position of the obstacle detected by the obstacle detector; and an information provider that executes a first notification of existence of the obstacle until the distance detector determines that the vehicle overtakes the obstacle, and a second notification of the existence of the obstacle within an extra distance or for an extra period of time.

In a non-limiting embodiment, the controller may further comprise an error detector that determines whether at least any one of an error of the position of the vehicle, an error of the position of the obstacle, and a lag time of communication between the vehicle and the obstacle is greater than a predetermined value. In addition, the information provider may be configured not to execute the second notification if the error of the position of the vehicle, the error of the position of the obstacle, and the lag time of communication between the vehicle and the obstacle are individually equal to or less than the predetermined values of those factors.

In a non-limiting embodiment, the information provider may be further configured to change contents of the notification between the first notification and the second notification.

In a non-limiting embodiment, the information provider may be further configured to notify a distance from the vehicle to the obstacle during the first notification, and terminates notification of the distance from the vehicle to the obstacle during the second notification.

In a non-limiting embodiment, the extra distance and the extra period of time may be set in advance.

In a non-limiting embodiment, the controller may further comprise a running condition detector that detects a running condition of the vehicle. In addition, the distance detector may be configured to: calculate the distance from the vehicle to the obstacle based on the position of the vehicle detected by the position detector and the position of the obstacle detected by the obstacle detector, and an estimated time to arrive at the obstacle based on a current position of the vehicle, the distance from the vehicle to the obstacle, and a speed of the vehicle detected by the running condition detector; and determine that the vehicle overtakes the obstacle based on a fact that the distance from the vehicle to the obstacle is reduced to zero, or a fact that an elapsed time from a time point at which the existence of the obstacle was detected by the obstacle detector reaches the estimated time.

In a non-limiting embodiment, the obstacle may include a stalled vehicle, and the vehicle may comprise a stalled vehicle detector that detects the stalled vehicle based on information received from the stalled vehicle through an inter-vehicle communication.

Thus, according to the exemplary embodiment of the present disclosure, the driver is notified of the existence of an obstacle ahead of the vehicle so that the driver is allowed to prepare for avoiding the obstacle. Specifically, the first notification is executed when the estimated distance to the obstacle is reduced to the first predetermined distance so that the information about the obstacle is provided to the driver at least until the vehicle overtakes the obstacle. Then, after the vehicle overtakes the obstacle, the second notification is executed to maintain the notification of the existence of the obstacle within the predetermined distance or the predetermined period of time. According to the exemplary embodiment of the present disclosure, therefore, the notification of the existence of the obstacle will not be terminated before the vehicle reaches the obstacle even if the estimated positions of the vehicle and the obstacle have errors and a reception of the information about the obstacle is delayed for some reason. For this reason, the driver is allowed to recognize the traveling environment properly.

If the estimated positions of the vehicle and the obstacle have no errors and a reception of the information about the obstacle is not delayed, the second notification will not be executed. That is, if the positional information about the vehicle and the positional information about the obstacle are accurate enough, the information about the existence of the obstacle will be provided to the driver certainly until the vehicle overtakes the obstacle only by executing the first notification. Thus, the driver is also allowed to recognize the traveling environment properly in this case without executing the second notification.

During the first notification, the distance to the obstacle is indicated in an indicator, however, the distance to the obstacle is not indicated in the indicator during the second notification. Therefore, even if the notification of the existence of the obstacle is maintained within the extra distance or extra period of time after overtaking the obstacle, the driver will not be confused by the information about the distance to the obstacle after overtaking the obstacle.

Specifically, the extra distance to maintain the notification the existence of the obstacle after overtaking the obstacle and the extra period of time corresponding thereto are calculated based on errors of the positional information of the vehicle and the obstacle and a delay in reception of the information about the obstacle. Therefore, the notification of the existence of the obstacle will not be maintained unnecessarily after overtaking the obstacle so that the driver will not be confused by the information about the obstacle after overtaking the obstacle.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION

Embodiments of the present disclosure will now be explained with reference to the accompanying drawings. Note that the embodiments shown below are merely examples of the present disclosure, and do not limit the present disclosure.

Figure 1:
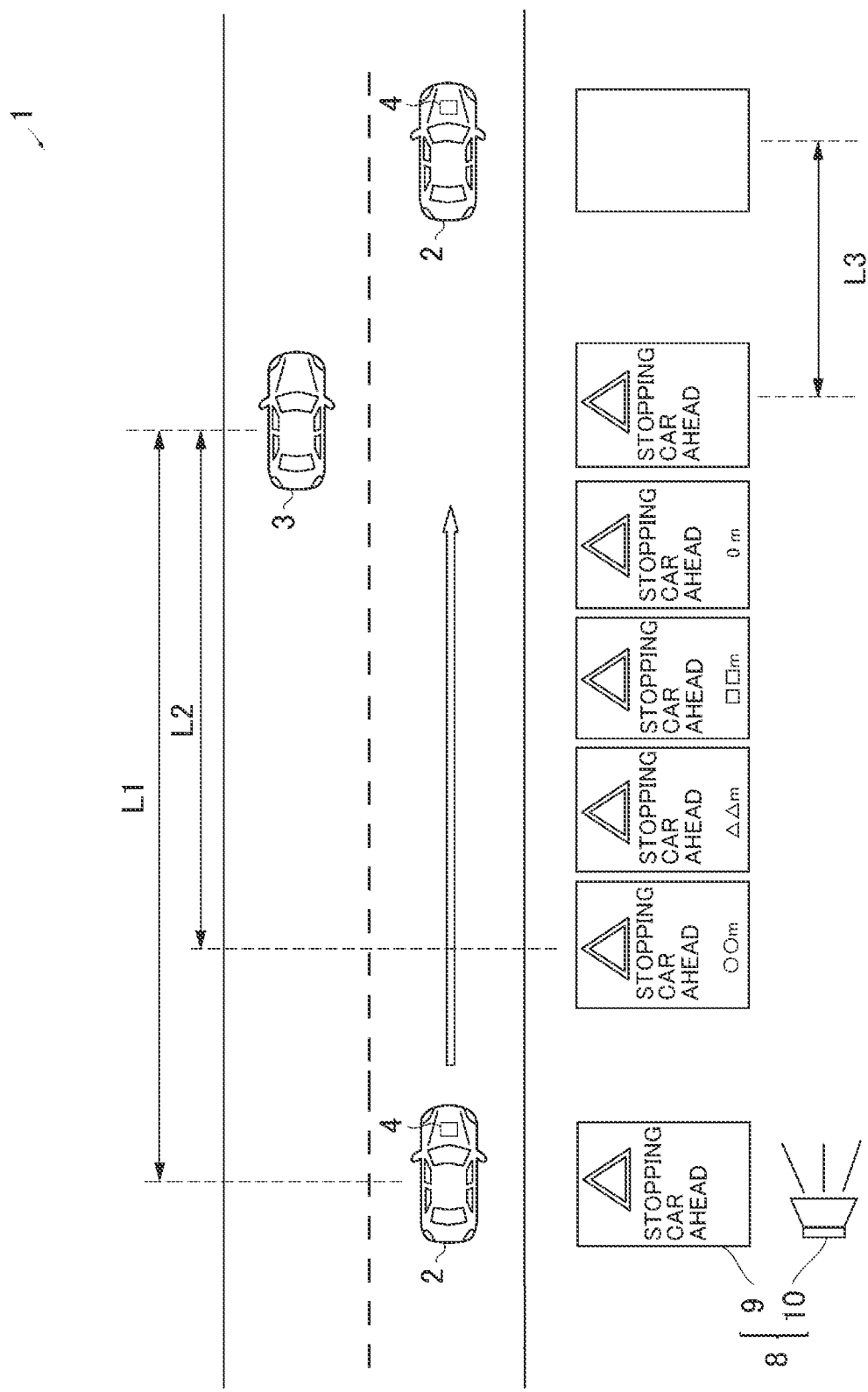
FIG. 1 is a schematic illustration showing one example of indication of information according to the exemplary embodiment of the present disclosure.

Turning now to FIG. 1, there is shown one embodiment of the driver assist system 1 according to the present disclosure. The driver assist system 1 is configured to assist a driver of a vehicle 2 to operate the vehicle 2 safely, and to this end, the vehicle 2 is provided with a controller 4 serving as an information processor shown in FIG. 2. For example, the driver assist system 1 may be applied to any kind of conventional vehicles such as a vehicle having an engine, an electric vehicle, a hydrogen fueled vehicle, a hybrid vehicle, and a fuel-cell vehicle. The controller 4 of the vehicle 2 has a function to communicate with other vehicle also having a communication function through a network to exchange information therebetween. Specifically, in the embodiment shown in FIG. 1, the controller 4 collects information about other vehicle 3 as an obstacle stalled ahead of the vehicle 2 through an inter-vehicle communication (V2V). For example, the inter-vehicle communication may be achieved through a mobile communication, a narrow band communication, a radio communication, a local service communication. In the vehicle 2, the information collected from other vehicle 3 is processed by the controller 4, and command signals are transmitted from the controller 4 to in-vehicle devices of the vehicle 2.

In addition, in order to assist the driver to operate the vehicle 2, the controller 4 also collects various information relating to traffic conditions such as an existence of an obstructive factor from an external source. According to the embodiment of the present disclosure, even if map data is not available in the vehicle 2, information about conditions of a road in front of and around the vehicle 2 may be collected by the controller 4 based on positional information of the vehicle 2 such as coordinate data, and the collected information may be provided to the driver. As an option, an instruction to operate the vehicle 2 based on the collected information may also be provided to the driver. For example, if the controller 4 collects information about an obstacle located ahead of the vehicle 2, information about details of the obstacle, and an instruction how to avoid or overtake the obstacle safely is provided to the driver. In order to avoid or overtake the obstacle, specifically, the driver is instructed to reduce a speed of the vehicle 2, turn the vehicle 2, or stop the vehicle 2.

Figure 3:
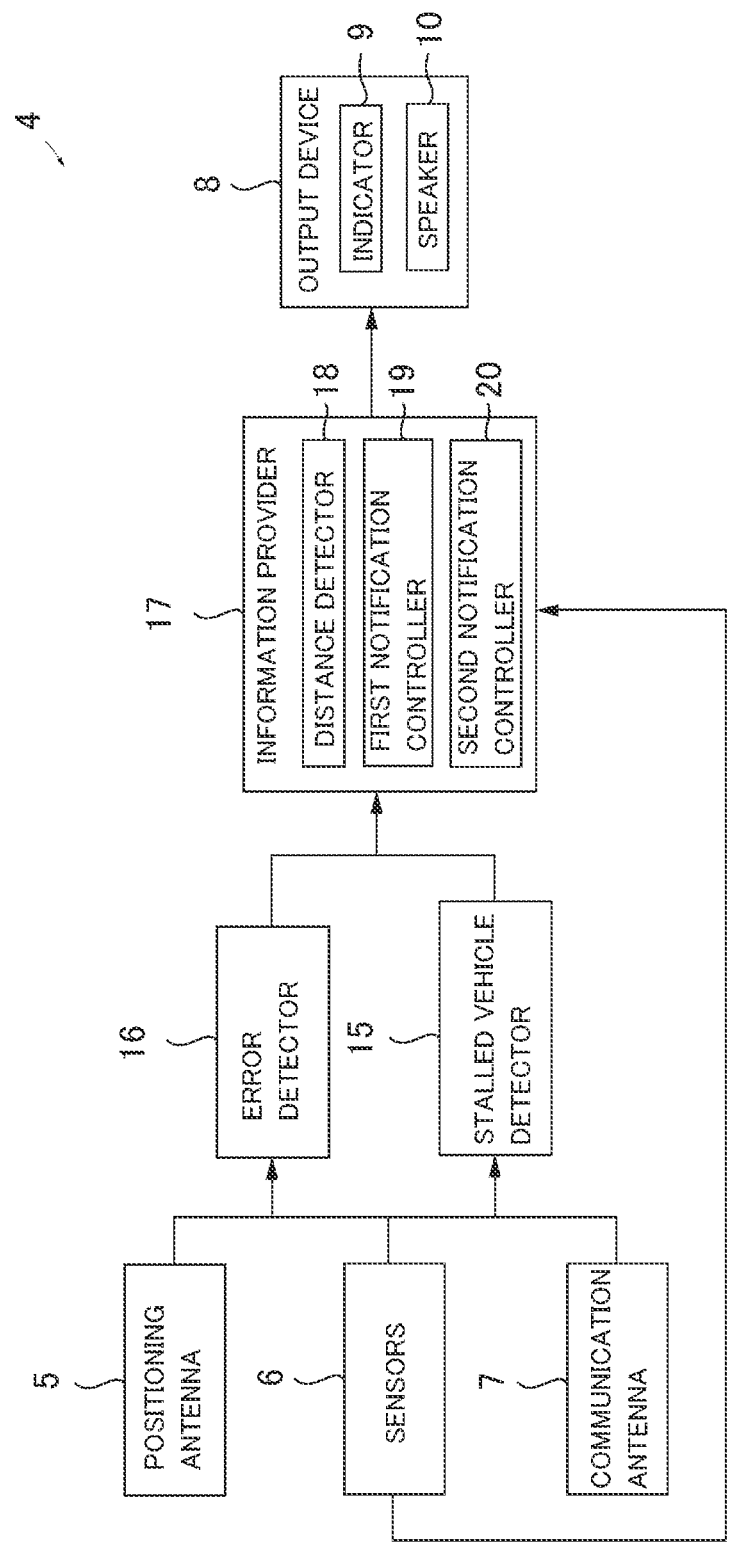
FIG. 3 is a block diagram showing a structure of the controller.

As shown in FIG. 3, an input member of the controller 4 includes a positioning antenna 5, sensors 6, and a communication antenna 7, and an output device 8 includes an indicator 9 and a speaker 10.

Specifically, the information about a current position of the vehicle 2 is received from an external positioning service such as a GPS (i.e., a Global Positioning System) of a GNSS (i.e., Global Positioning Satellite System) through the positioning antenna 5. For example, the controller 4 receives a GPS signal transmitted from GPS satellite, and specifies a current position of the vehicle 2 based on information about an orbit and a clock time of an atomic clock contained in the GPS signal. That is, the positioning antenna 5 may serve not only as a GPS signal receiver but also as a position detector. Specifically, the GPS signal receiver calculates each difference between the vehicle 2 and the GPS satellites by multiplying: each time difference between a clock time at which the GPS signal is transmitted from the GPS satellite and a clock time at which the GPS signal receiver receives the GPS signal; by a propagation velocity of a radio wave (i.e., a speed of light). Then, the GPS signal receiver determines an intersecting point of all circles having a radius between the vehicle 2 and each of the GPS satellites as a current position of the vehicle 2. Instead, as the positioning service, a location database associating places with identification numbers of Wi-Fi™ access points may also be utilized to specify the current position of the vehicle 2.

The sensors 6 serve as a running condition detector to collect information about running conditions of the vehicle 2. To this end, the sensors 6 include a vehicle speed sensor, a wheel speed sensor, a steering sensor, a gyroscope sensor, an acceleration sensor, a brake sensor, an accelerator sensor, a radar sensor, a lidar sensor, and an on-board camera.

Specifically, the communication antenna 7 is a non-directional antenna that receives traffic information mainly about an obstructive factor on a road to serve as an obstacle detector. For example, the communication antenna 7 receives a signal representing a location of the stalled vehicle 3, a signal representing a lane where the stalled vehicle 3 stops, and a signal representing a condition of the stalled vehicle 3. The signals received by the communication antenna 7 is demodulated and further transmitted to other devices.

The traffic information about an obstructive factor located within a predetermined area ahead of the vehicle 2 is provided to the driver through the output device 8. As described, the output device 8 includes the indicator 9 that visually (i.e., imagery) indicates information, and the speaker 10 that emits a voice message. In the vehicle 2, dedicated monitor and speaker may serve as the output device 8. Instead, a navigation system having a monitor for indicating a map information and a speaker may also serve as the output device 8. In the embodiment shown in FIG. 1, the output device 8 provides information about an obstructive factor located within a first predetermined distance L1.

For example, as illustrated in FIG. 1, the speaker 10 emits a voice message or a sound effect such as a warning beep, and the indicator 9 indicates a distance to the obstruct together with a warning sign so as to alert the driver to the obstacle located ahead of the vehicle 2. According to the embodiment of the present disclosure, the warning sign is indicated in the indicator 9 when the stalled vehicle 3 is detected within the first predetermined distance L1, and the indication of the warning sign is maintained until the vehicle 2 overtakes the stalled vehicle 3. On the other hand, the voice message or the warning beep is emitted when the stalled vehicle 3 is detected within the first predetermined distance L1, and may be emitted again when the vehicle 2 comes close to the stalled vehicle 3 to alert the driver. According to the embodiment shown in FIG. 1, the indication of the distance to the stalled vehicle 3 is started when the distance from the vehicle 2 to the stalled vehicle 3 is reduced to a second predetermined distance L2, and terminated when the vehicle 2 passes by the stalled vehicle 3. As an option, the distance to the stalled vehicle 3 may be counted down as the vehicle 2 approaches the stalled vehicle 3. To this end, the predetermined distance L2 may be set to a distance sufficient to avoid the stalled vehicle 3 or stop the vehicle 2 before reaching the stalled vehicle 3 without requiring an emergency operation.

Such information about the stalled vehicle 3 may be provided to the driver only by any one of the indicator 9 and the speaker 10, and contents of the information may be changed arbitrarily depending on the situation. In addition, the warning beep may be not only a single beep but also a combination of beeps and tones. Likewise, design and color of the warning may also be changed according to need. Specifically, the massage and the image processed by a graphic interface of an after-mentioned processor 11 are indicated in the indicator 9, and the voice message and the sound effect created by processing audio signals created by the processor 11 are emitted from the speaker 10.

Figure 2:
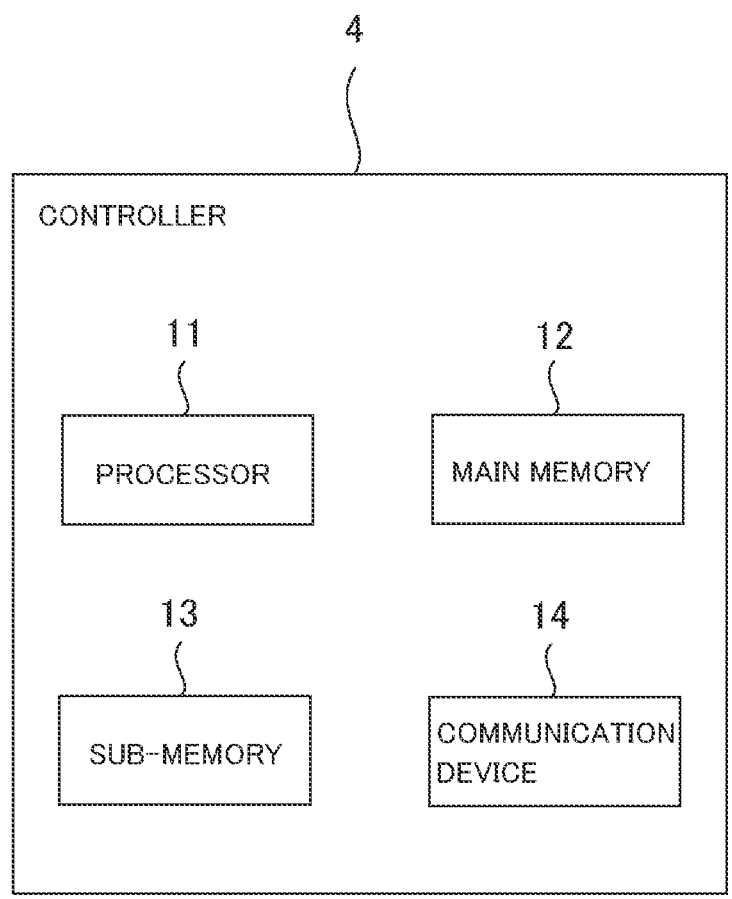
FIG. 2 is a block diagram showing functions of a controller of the driver assist system according to the exemplary embodiment of the present disclosure.

As illustrated in FIG. 2, the controller 4 comprises a processor 11, a main memory 12, a sub-memory 13, and a communication device 14. According to the embodiment of the present disclosure, the controller 4 executes a desired control by loading a program stored in a storage media on a workspace of the main memory 12 by the processor 11.

For example, a CPU (i.e., a Central Processing Unit) or a DSP (i.e., a Digital Signal Processor) may be employed as the processor 11 to perform computation.

The main memory 12 includes a RAM (i.e., a Random Access Memory) and a ROM (i.e., a Read Only Memory). As mentioned above, the workspace in which the processor 11 executes a program is created in the main memory 12.

The sub-memory 13 includes a removable storage media such as an EPROM (i.e., an Erasable Programmable ROM), an HDD (i.e., a Hard Disk Drive), a USB (i.e., Universal Serial Bus) memory, a CD, (i.e., a Compact Disc), and a DVD (i.e., a Digital Versatile Disc). That is, various data, programs, tables, an operating system etc., are stored not only in the main memory 12 but also in the sub-memory 13.

The communication device 14 as a communication circuit exchanges data wirelessly with external facilities and devices. Therefore, the vehicle 2 is allowed to exchange data with other vehicles through the inter-vehicle communication utilizing 5G (i.e., 5th Generation) or LTE (i.e., Long Tram Evolution). Instead, data may also be exchanged between the vehicle 2 and other vehicles or external facilities through a narrow band communication such as DSRC (i.e., Dedicated Short Range Communication), a radio communication such as Wi-Fi, or a short-range communication such as BLE (i.e., Bluetooth Low Energy). For example, the external facility includes a VICS (i.e., a Vehicle Information and Communication System) and a roadside communication equipment.

Thus, the controller 4 performs data processing not only by the foregoing hardware but also by the software installed in the foregoing hardware. According to the embodiment of the present disclosure, the stalled vehicle 3 is equipped with an information processor similar to the controller 4.

As shown in FIG. 3, the controller 4 further comprises a stalled vehicle detector 15, an error detector 16, and an information provider 17.

The stalled vehicle detector 15 detects a vehicle stalled on a road ahead of the vehicle 2, based on information about a current position of the vehicle 2 received through the positioning antenna 5, information about running condition of the vehicle 2 collected by the sensors 6, and information about positions of other vehicles received through the communication antenna 7.

To this end, specifically, the stalled vehicle detector 15 obtains a current position of the vehicle 2 from the positioning antenna 5, and detects a traveling direction of the vehicle 2, a speed of the vehicle 2, and a lane on which the vehicle 2 is driving, based on the data collected by the sensors 6 while with reference to the map data stored in the main memory 12 or the sub-memory 13. Then, the stalled vehicle detector 15 detects a vehicle which may block a passage of the vehicle 2 based on the information collected through the communication antenna 7. Consequently, if the stalled vehicle 3 shown in FIG. 1 is detected, information about current positions of the vehicle 2 and the stalled vehicle 3 is transmitted to the information provider 17.

The error detector 16 calculates errors of current positions of the vehicle 2 and the stalled vehicle 3, and a lag time of an exterior communication of the vehicle 2. As described, the current positions of the vehicle 2 and the stalled vehicle 3 estimated based on e.g., the GPS signals contain errors caused by various factors. That is, the current positions of the vehicle 2 and the stalled vehicle 3 specified based on the GPS signals may be slightly different from actual positions of the vehicle 2 and the stalled vehicle 3. Therefore, the error detector 16 calculates an error as a difference between the actual position of the vehicle 2 and the position of the vehicle 2 estimated based on the GPS signal utilizing correction information received from more reliable information source such as DGPS (i.e., a differential GPS) and SBAS (i.e., a satellite-based argumentation system). Likewise, the error detector 16 also calculates an error as a difference between the actual position of the stalled vehicle 3 and the position of the stalled vehicle 3 estimated based on the GPS signal utilizing the correction information received from the DGPS and the SBAS.

As also described, the exterior communication of the vehicle 2 is delayed inevitably due to various external factors. Therefore, the error detector 16 also calculates a lag time of an exterior communication of the vehicle 2 based on a time-stamp contained in the collected positional information. For example, a lag time of the communication between the vehicle 2 and the stalled vehicle 3 may be calculated by comparing a time of a quartz clock arranged in the vehicle 2 with a time-stamp at which the stalled vehicle 3 received e.g., the positional information thereof from the external facility which is contained in the signal transmitted from the stalled vehicle 3 to the vehicle 2.

In addition, the error detector 16 determines whether the error of the position of the vehicle 2 estimated based on the GPS signal is greater than a predetermined value, and/or whether the lag time of the communication between the vehicle 2 and the stalled vehicle 3 is greater than a predetermined value. To this end, each of the predetermined values are set to values at which the distance to the stalled vehicle 3 may be provided accurately enough to the driver by the output device 8. If the error of the position or the lag time of the communication is greater than the predetermined value, the distance to the stalled vehicle 3 may not be provided accurately to the driver. In this case, therefore, a concrete numerical value of the error or the lag time will be transmitted from the error detector 16 to the information provider 17. By contrast, if the error of the position or the lag time of the communication is equal to or less than the predetermined value, the distance to the stalled vehicle 3 may be provided accurately to the driver. In this case, a concrete numerical value of the error or the lag time will also be transmitted from the error detector 16 to the information provider 17 so as to inform the information provider 17 that the error or the lag time falls within an allowable range.

The information provider 17 provides information about the stalled vehicle 3 to the driver of the vehicle 2. To this end, the information provider 17 collects information from the stalled vehicle detector 15 about a distance from the vehicle 2 to the stalled vehicle 3. When the distance from the vehicle 2 to the stalled vehicle 3 is reduced to the first predetermined distance L1 or shorter, the information provider 17 operates the output device 8 to notify the driver of the existence of the stalled vehicle 3 in front of the vehicle 2. Then, when the distance from the vehicle 2 to the stalled vehicle 3 is further reduced to the second predetermined distance L2 or shorter, the information provider 17 operates the output device 8 to provide details about the stalled vehicle 3 such as the distance to the stalled vehicle 3 to the driver. In order to deliver such notifications to the driver, the information provider 17 comprises a distance detector 18, a first notification controller 19, and a second notification controller 20.

The distance detector 18 calculates the distance from the vehicle 2 to the stalled vehicle 3 based on the information about a current position of the vehicle 2 received through the positioning antenna 5 and the positional information received from the stalled vehicle detector 15. When the distance from the vehicle 2 to the stalled vehicle 3 calculated by the distance detector 18 is reduced to the first predetermined distance L1 or shorter, the distance detector 18 transmits a command to the first notification controller 19 so as to provide the information about the stalled vehicle 3 to the driver. Then, when the distance from the vehicle 2 to the stalled vehicle 3 calculated by the distance detector 18 is further reduced to the second predetermined distance L2 or shorter, the distance detector 18 transmits a command to the first notification controller 19 so as to provide the detailed information about the stalled vehicle 3 to the driver. That is, the information about the stalled vehicle 3 will not be provided to the driver until the distance from the vehicle 2 to the stalled vehicle 3 is reduced to the first predetermined distance L1. In addition, if the stalled vehicle 3 is positioned in an opposite lane, the information about the stalled vehicle 3 will not be provided to the driver.

When the distance from the vehicle 2 to the stalled vehicle 3 calculated by the distance detector 18 is reduced to zero, the distance detector 18 provides information to the first notification controller 19 about a fact that the vehicle 2 reaches the stalled vehicle 3. For example, the fact that the vehicle 2 overtakes the stalled vehicle 3 is determined based on the distance from the vehicle 2 to the stalled vehicle 3 calculated based on the positional information of those vehicles received through the positioning antenna 5 and the communication antenna 7. Instead, the fact that the vehicle 2 overtakes the stalled vehicle 3 may also be determined based on a fact that an elapsed time from a time point at which the existence of the stalled vehicle 3 was detected by the stalled vehicle detector 15 reaches an estimated time to reach the stalled vehicle 3 estimated based on the current position of the vehicle 2 detected by the positioning antenna 5, the distance to the stalled vehicle 3 calculated by the distance detector 18, and a speed of the vehicle 2 detected by the sensors 6.

Figure 4:
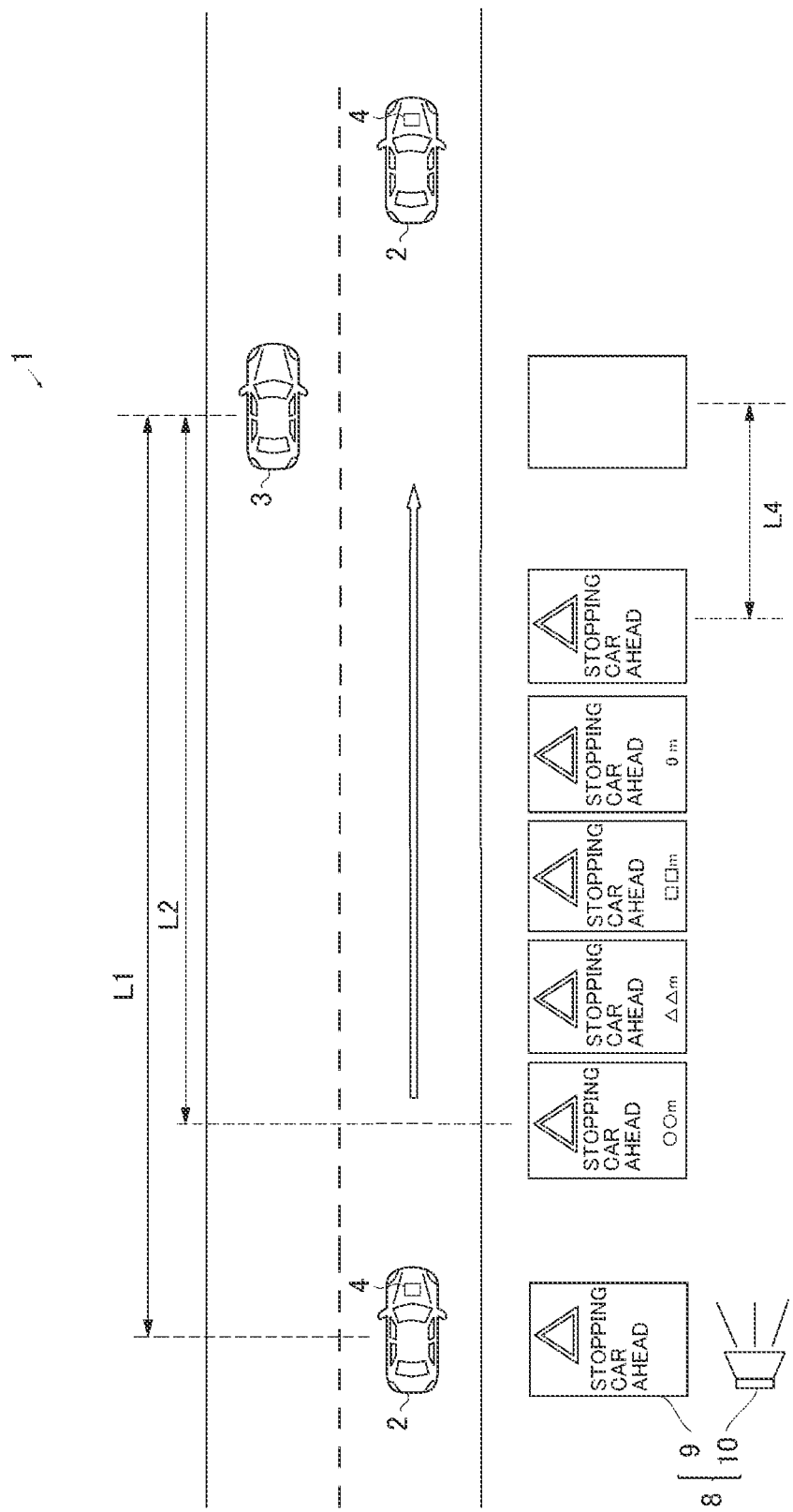
FIG. 4 is a schematic illustration showing another example of indication of information according to the exemplary embodiment of the present disclosure.

The first notification controller 19 transmits a command to the output device 8 so as to start a first notification of the existence of the stalled vehicle 3 when the distance from the vehicle 2 to the stalled vehicle 3 is reduced to the first predetermined distance L1 or shorter. Consequently, as illustrated in FIGS. 1 and 4, a warning sign and a message are indicated in the indicator 9, and a voice message or a warning beep is emitted from the speaker 10 so as to notify the driver of the existence of the stalled vehicle 3. Then, when the distance from the vehicle 2 to the stalled vehicle 3 is further reduced to the second predetermined distance L2 or shorter, the first notification controller 19 transmits a command to the output device 8 so as to start the provision of the detailed information about the stalled vehicle 3 to the driver. Consequently, as illustrated in FIGS. 1 and 4, a distance to the stalled vehicle 3 is indicated in the indicator 9 in addition to the warning sign and the message. Thereafter, when the distance from the vehicle 2 to the stalled vehicle 3 calculated by the distance detector 18 is reduced to zero, that is when the vehicle 2 overtakes the stalled vehicle 3, the first notification controller 19 transmits a command to the output device 8 so as to terminate the first notification of the existence of the stalled vehicle 3.

If the error detector 16 determines that the error of at least one of the current positions of the vehicle 2 and the stalled vehicle 3 is/are greater than a predetermined value(s), and/or the lag time of the communication between the vehicle 2 and the stalled vehicle 3 is greater than a predetermined value, the error detector 16 transmits a command to the second notification controller 20 so as to continue the notification of the of existence of the stalled vehicle 3 even after the termination of the first notification.

In this case, the second notification controller 20 calculates an extra period of time or an extra distance L4 shown in FIG. 4 to continue the notification of existence of the stalled vehicle 3 based on the errors and the lag time calculated by the error detector 16. Then, when the distance from the vehicle 2 to the stalled vehicle 3 calculated by the distance detector 18 is reduced to zero, the second notification controller 20 starts a second notification to continue the notification of the existence of the stalled vehicle 3 for the calculated extra period of time or within the extra distance L4. After the end of the extra period of time or after traveling the extra distance L4, the second notification controller 20 transmits a command to the output device 8 so as to terminate the second notification. Here, it is to be noted that the distance to the stalled vehicle 3 is neither indicated in the indicator 9 nor emitted from the speaker 10 during the second notification.

The above-mentioned differential GPS and satellite-based argumentation system may not always be available depending on the position of the vehicle 2 and a condition of wireless environment. If those systems are not available, concrete numerical values of errors of the position of the vehicle 2 and the stalled vehicle 3 may not be obtained from those systems. Likewise, the signal containing a time-stamp may not always be received properly from the stalled vehicle 3 depending on the position of the vehicle 2 and a condition of wireless environment. If the time-stamp may not be received properly from the stalled vehicle 3, a concrete numerical value of a lag time of the communication between the vehicle 2 and the stalled vehicle 3 may not be obtained. In order to prepare for those situations, the extra period of time may also be set to a predetermined period of time in advance, and the extra distance L3 may also be set to a predetermined distance in advance. In addition, the second notification controller 20 may be configured to always continue the notification of the existence of the stalled vehicle 3 for the extra period of time or within the extra distance L3 irrespective of the error of the current position of the vehicle 2 or the stalled vehicle 3 and the lag time of the communication between the vehicle 2 and the stalled vehicle 3.

If the error detector 16 determines that the error of the current position of the vehicle 2 and/or the stalled vehicle 3 is/are less than the predetermined value(s) and that the lag time of the communication between the vehicle 2 and the stalled vehicle 3 is also less than the predetermined value, the second notification controller 20 will not continue the notification of the existence of the stalled vehicle 3 after the termination of the first notification. That is, the second notification will not be executed in this case. By contrast, if the distance to the stalled vehicle 3 is calculated based on the positional information containing errors, the notification of the existence of the stalled vehicle may be delayed and continued even after the vehicle 2 overtakes the stalled vehicle 3. In this case, the notification will not be terminated before overtaking the stalled vehicle 3 even if the notification is started based only on the distance from the vehicle 2 to the stalled vehicle 3 calculated by the distance detector 18. In this case, therefore, it is also not necessary to execute the second notification.

Figure 5:
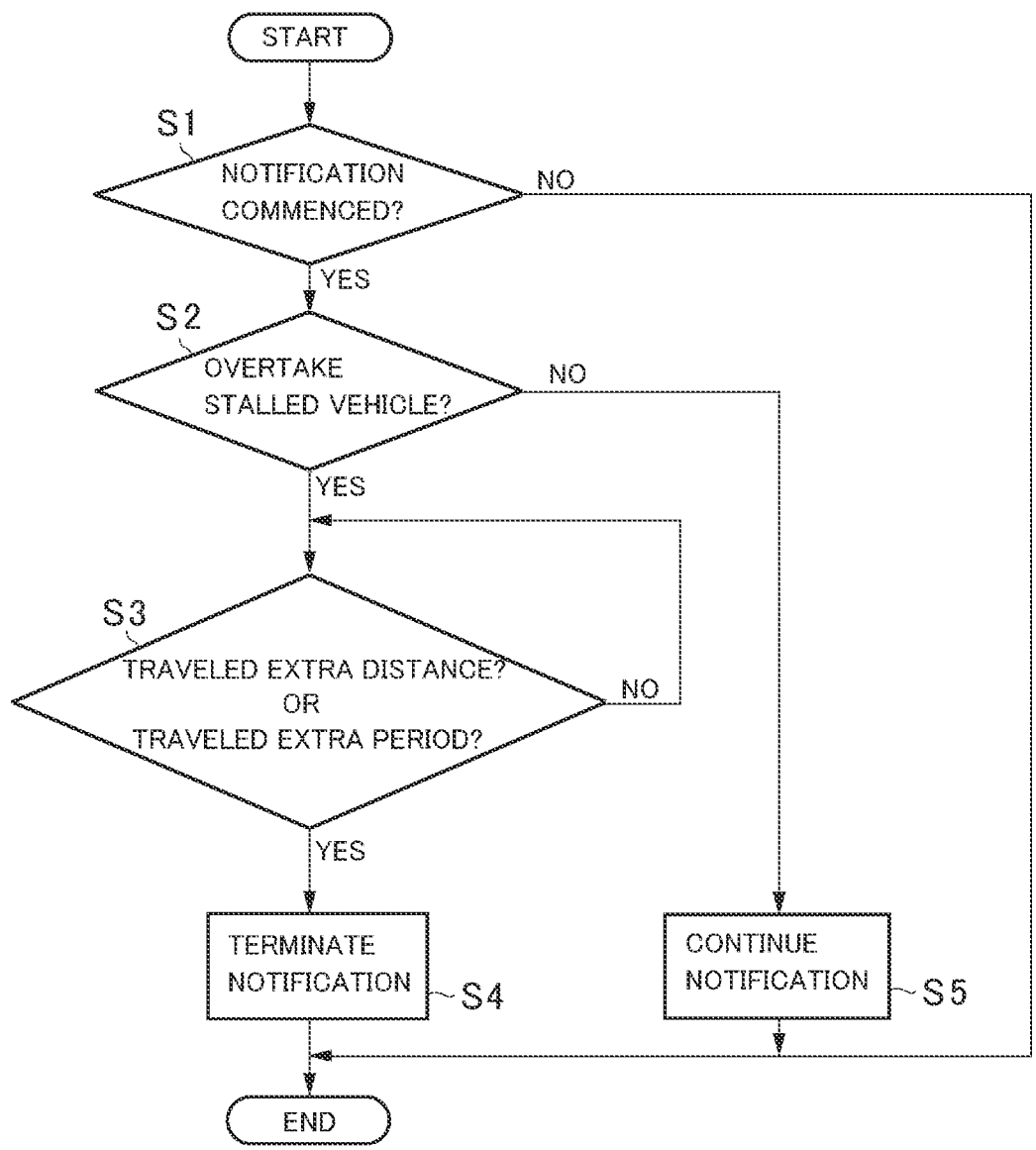
FIG. 5 is a flowchart showing one example of a routine executed by the driver assist system.

Turning to FIG. 5, there is shown one example of a routine executed by the driver assist system 1 according to the embodiment of the present disclosure. Specifically, the routine shown in FIG. 5 is executed to provide the information about the distance to the stalled vehicle 3 to the driver of the vehicle 2 in the case that concrete numerical values of errors of the position of the vehicle 2 and the stalled vehicle 3 may not be obtained from the above-mentioned information source, or that the time-stamp may not be received properly from the stalled vehicle 3. To this end, the routine shown in FIG. 5 is commenced when the distance from the vehicle 2 to the stalled vehicle 3 is reduced to the first predetermined distance L1 or shorter.

At step S1, it is determined whether the first notification has already been commenced to provide the information about the existence of the stalled vehicle 3 ahead of the vehicle 2 based on the information collected through the communication antenna 7. For example, the first notification is commenced when the distance from the vehicle 2 to the stalled vehicle 3 is reduced to the first predetermined distance L1. Instead, the first notification may also be commenced when the distance from the vehicle 2 to the stalled vehicle 3 is reduced to the second predetermined distance L2. That is, the first notification is not commenced if the stalled vehicle 3 has not yet been detected, if the distance to the stalled vehicle 3 is still longer than the first predetermined distance L1 or the second predetermined distance L2, if the vehicle 2 turns to change a traveling direction different from the direction toward the stalled vehicle 3, or if the vehicle 2 shifts to a different lane oriented to different direction from the stalled vehicle 3. If the first notification has not yet been commenced so that the answer of step S1 is NO, the routine returns. By contrast, if the first notification has already been commenced so that the answer of step S1 is YES, the routine progresses to step S2 to determine whether the vehicle 2 overtakes the stalled vehicle 3.

Specifically, such determination at step S2 is made based on the distance from the vehicle 2 to the stalled vehicle 3 calculated by the distance detector 18, and a traveling distance of the vehicle 2 measured by the sensors 6. As described, the distance from the vehicle 2 to the stalled vehicle 3 is calculated by the distance detector 18 based on the current position of the vehicle 2 received through the positioning antenna 5, and the position of the stalled vehicle 3 received through the communication antenna 7. For example, the determination of the fact that the vehicle overtakes the stalled vehicle 3 is made based on the fact that the vehicle 2 has traveled the distance to the stalled vehicle 3 calculated by the distance detector 18 and consequently the distance calculated by the distance detector 18 is reduced to zero. Instead, the determination of the fact that the vehicle overtakes the stalled vehicle 3 may also be made based on the fact that the elapsed time from the time point at which the stalled vehicle 3 was detected reaches the estimated time to arrive at the stalled vehicle 3 estimated based on the current position of the vehicle 2, the distance to the stalled vehicle 3, and the speed of the vehicle 2. If the vehicle 2 has not yet overtaken the stalled vehicle 3 so that the answer of step S2 is NO, the routine progresses to step S5 to continue the first notification, and thereafter returns.

By contrast, if the vehicle 2 has overtaken the stalled vehicle 3 so that the answer of step S2 is YES, the routine progresses to step S3 to determine whether the vehicle 2 have traveled the extra distance L3 or for the extra period of time after the commencement of the second notification. For example, the extra distance L3 is set to a distance sufficient to maintain the notification of the existence of the stalled vehicle 3 until the vehicle 3 overtakes the stalled vehicle 3, and calculated taking account of a maximum error of the current position of the vehicle 2 specified based on the GPS signal and a maximum lag time of the communication between the vehicle 2 and the external information source including the stalled vehicle 3. On the other hand, the extra period of time is set to a period sufficient to maintain the notification of the existence of the stalled vehicle 3 until the vehicle 3 overtakes the stalled vehicle 3, and calculated taking account of a maximum error of the current position of the vehicle 2 specified based on the GPS signal and a maximum lag time of the communication between the vehicle 2 and the external information source including the stalled vehicle 3.

If the vehicle 2 has traveled the extra distance L3 or for the extra period of time so that the answer of step S3 is YES, the routine progresses to step S4 to terminate the second notification, and thereafter the routine returns. By contrast, if the vehicle 2 has not yet traveled the extra distance L3 or for the extra period of time so that the answer of step S3 is NO, the routine returns to step S3 to repeat such determination until the vehicle 2 travels the extra distance L3 or for the extra period of time, and thereafter the routine returns. Here, during the second notification, the distance to the stalled vehicle 3 will not be indicated in the indicator 9. That is, indication of the distance to the stalled vehicle 3 is terminated when the distance to the stalled vehicle 3 calculated by the distance detector 18 is reduced to zero.

Thus, according to the example shown in FIG. 5, the driver assist system 1 notifies the driver of the existence of the stalled vehicle 3 within the first predetermined distance L1. According to the embodiment of the present disclosure, therefore, the driver of the vehicle 2 is allowed to prepare for avoiding the stalled vehicle 3. In addition, the notification of the existence of the stalled vehicle 3 is maintained within the extra distance or for the extra period of time even after overtaking the stalled vehicle 3. Therefore, even if the distance to the stalled vehicle 3 calculated by the distance detector 18 is shorter than the actual distance to the stalled vehicle 3 due to error, the notification of the existence of the stalled vehicle 3 will not be terminated undesirably before the vehicle 2 overtakes the stalled vehicle 3. That is, even if the notification of the existence of the stalled vehicle 3 is maintained only for a short time after overtaking the stalled vehicle 3, the driver of the vehicle 2 will not be confused by such notification being maintained. Rather, if the notification of the existence of the stalled vehicle 3 is terminated before overtaking the stalled vehicle 3, the driver of the vehicle 2 would be confused by such disappearance of the information. For these reasons, according to the embodiment of the present disclosure, the driver is allowed to certainly prepare for avoiding the stalled vehicle 3 by reducing a speed of the vehicle 2 or stopping the vehicle 2.

Figure 6:
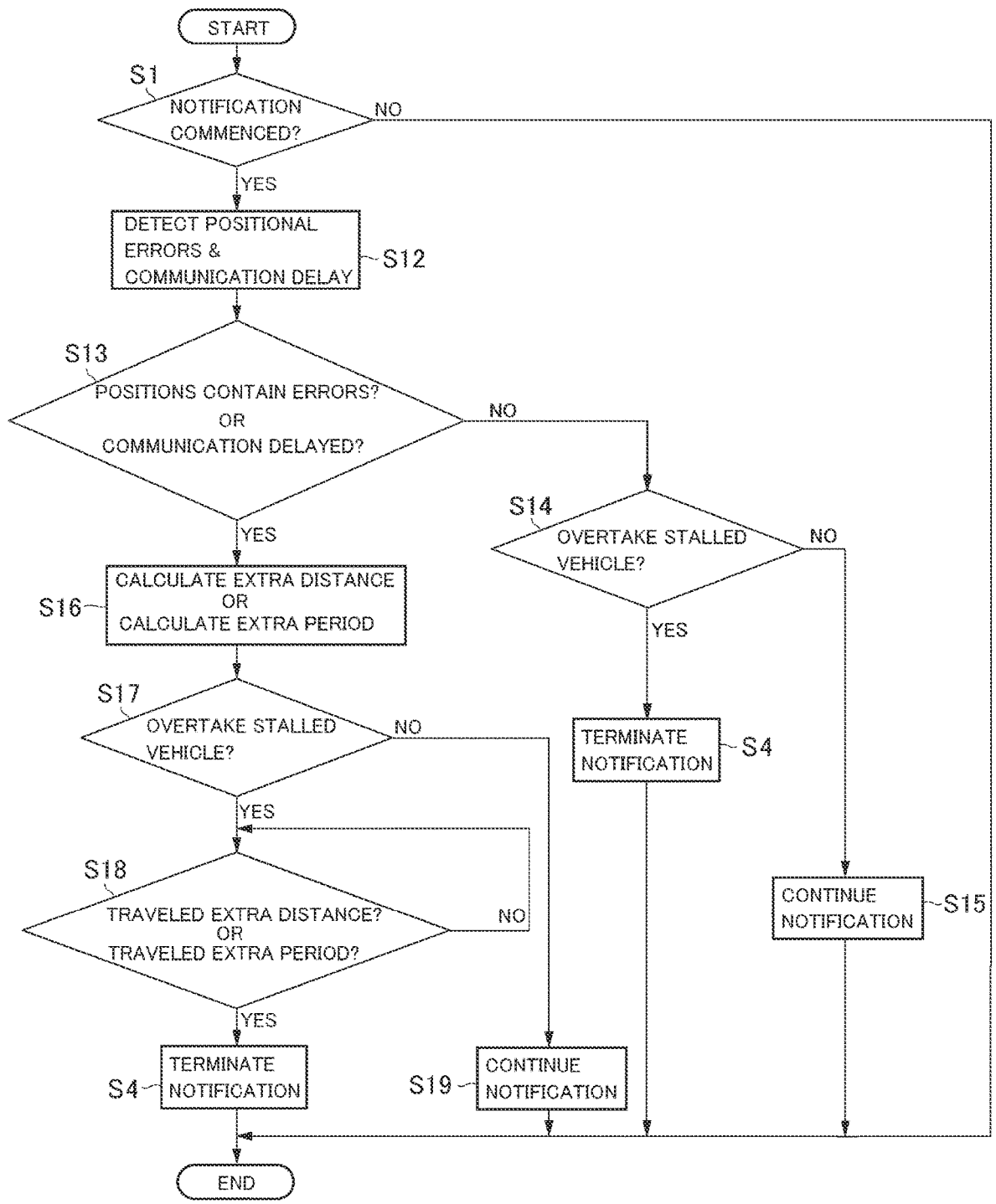
FIG. 6 is a flowchart showing another example of the routine executed by the driver assist system.

Next, here will be explained another example of a routine executed by the driver assist system 1 with reference to FIG. 6. Specifically, the routine shown in FIG. 6 is configured to adjust a distance of the extra distance L3 or a length of the extra period of time in accordance with errors of the positions of the vehicle 2 and the stalled vehicle 3 or a delay in the communication between the vehicle 2 and e.g., the stalled vehicle 3. In the following descriptions, explanations for the steps in common with those of the routine shown in FIG. 5 will be simplified.

As the routine shown in FIG. 5, at step S1, it is determined whether the first notification has already been commenced to provide the information about the existence of the stalled vehicle 3 ahead of the vehicle 2. If the first notification has not yet been commenced so that the answer of step S1 is NO, the routine returns. By contrast, if the first notification has already been commenced so that the answer of step S1 is YES, the routine progresses to step S12 to obtain errors of the positions of the vehicle 2 and the stalled vehicle 3, and a delay in the reception of the information about the stalled vehicle 3.

As described, the errors of the positions of the vehicle 2 and the stalled vehicle 3 may be calculated based on the correction information received from the DGPS and the SBAS. On the other hand, a communication lag time between the vehicle 2 and e.g., the stalled vehicle 3 may be calculated based on a time-stamp contained in the positional information received from the stalled vehicle 3.

Thereafter, it is determined at step S13 whether the positions of the vehicle 2 and the stalled vehicle 3 estimated based on the positional information contain errors, or whether the communication between the vehicle 2 and the stalled vehicle 3 is delayed. Specifically, it is determined at step S13 whether the errors of the positions of the vehicle 2 and the stalled vehicle 3 estimated based on the positional information are individually greater than the predetermined values, or whether the lag time of the communication between the vehicle 2 and the stalled vehicle 3 is greater than the predetermined value. As described, each of the predetermined values are set to values at which the distance to the stalled vehicle 3 may be provided accurately enough to the driver by the output device 8. That is, if the errors of the positions of the vehicles 2 and 3 are equal to or less than the predetermined values, those errors are ignorable and the distance to the stalled vehicle 3 may be provided accurately enough to the driver during the first notification. Likewise, if the lag time of the communication between the vehicles 2 and 3 is equal to or less than the predetermined value, the lag time is ignorable and the distance to the stalled vehicle 3 may also be provided accurately enough to the driver during the first notification. Accordingly, if the positions of the vehicle 2 and the stalled vehicle 3 do not contain errors, and the communication between the vehicle 2 and the stalled vehicle 3 is not delayed so that the answer of step S13 is NO, the routine progresses to step S14 to determine whether the vehicle 2 overtakes the stalled vehicle 3 based on the positions of the vehicle 2 and the stalled vehicle 3 estimated based on the positional information.

Such determination at step S14 may be made by the same procedures as those of step S2 of the foregoing routine shown in FIG. 5. If the vehicle 2 has overtaken the stalled vehicle 3 so that the answer of step S14 is YES, the routine progresses to step S4 to terminate the first notification, and thereafter the routine returns. By contrast, if the vehicle 2 has not yet overtaken the stalled vehicle 3 so that the answer of step S14 is NO, the routine progresses to step S15 to continue the first notification until the vehicle 2 overtakes the stalled vehicle 3, and thereafter returns.

Whereas, if the errors of the positions of the vehicle 2 and the stalled vehicle 3 estimated based on the positional information are individually greater than the predetermined values, or the lag time of the communication between the vehicle 2 and the stalled vehicle 3 is greater than the predetermined value so that the answer of step S13 is YES, the routine progresses to step S16. At step S16, specifically, the extra distance L4 is calculated by adding the error of the position of the stalled vehicle 3 to the error of the position of the vehicle 2. In addition, in order to adjust the extra distance L4 accurately, the lag time of the communication between the vehicle 2 and the stalled vehicle 3 is calculated by comparing a time of the quartz clock arranged in the vehicle 2 with a time-stamp contained in the information received from the stalled vehicle 3 at which the stalled vehicle 3 transmits the information. Consequently, the extra distance in which the notification of the existence of the stalled vehicle 3 is to be maintained during the second notification or the extra period of time corresponding to the extra distance L4 may be adjusted accurately.

At step S17, it is determined whether the vehicle 2 overtakes the stalled vehicle 3. As explained at step S2 of the foregoing routine, the determination of the fact that the vehicle overtakes the stalled vehicle 3 is made based on the fact that the vehicle 2 has traveled the distance to the stalled vehicle 3 calculated by the distance detector 18 and consequently the distance calculated by the distance detector 18 is reduced to zero. Instead, the determination of the fact that the vehicle overtakes the stalled vehicle 3 may also be made based on the fact that the elapsed time from the time point at which the stalled vehicle 3 was detected reaches the estimated time to arrive at the stalled vehicle 3 estimated based on the current position of the vehicle 2, the distance to the stalled vehicle 3, and the speed of the vehicle 2. If the vehicle 2 has not yet overtaken the stalled vehicle 3 so that the answer of step S17 is NO, the routine progresses to step S19 to continue the first notification, and thereafter returns. By contrast, if the vehicle 2 has overtaken the stalled vehicle 3 so that the answer of step S17 is YES, the routine progresses to step S18 to determine whether the vehicle 2 have traveled the extra distance L3 or for the extra period of time calculated at step S16 after the commencement of the second notification.

If the vehicle 2 has traveled the extra distance L3 or for the extra period of time so that the answer of step S18 is YES, the routine progresses to step S4 to terminate the second notification. In this case, the notification of the existence of the stalled vehicle 3 is continued at least until the vehicle 2 has overtaken the stalled vehicle 3, therefore, the second notification is terminated, and thereafter the routine returns. By contrast, if the vehicle 2 has not yet traveled the extra distance L3 or for the extra period of time so that the answer of step S18 is NO, the routine returns to step S18 to repeat such determination until the vehicle 2 travels the extra distance L3 or for the extra period of time, and thereafter the routine returns. As described, during the second notification, the distance to the stalled vehicle 3 will not be indicated in the indicator 9. That is, indication of the distance to the stalled vehicle 3 is terminated when the distance to the stalled vehicle 3 calculated by the distance detector 18 is reduced to zero.

Thus, according to another example shown in FIG. 6, the extra distance L3 is calculated based on the errors of the positions of the position of the vehicle 2 and the stalled vehicle 3, and the notification of the existence of the stalled vehicle 3 is continued until the vehicle 2 has traveled the extra distance L3 or the extra period of time corresponding thereto. According to another example of the present disclosure, therefore, the notification of the existence of the stalled vehicle 3 will not be terminated undesirably before the vehicle 2 overtakes the stalled vehicle 3. For this reason, the driver is allowed to certainly prepare for avoiding the stalled vehicle 3 by reducing a speed of the vehicle 2 or stopping the vehicle 2.

Although the above exemplary embodiments of the present disclosure have been described, it will be understood by those skilled in the art that the present disclosure should not be limited to the described exemplary embodiments, and various changes and modifications can be made within the scope of the present disclosure. For example, if the errors of the positions of the vehicle 2 and the stalled vehicle 3 as well as the lag time of the communication between those vehicles are ignorable, the notification of the existence of the stalled vehicle may also be terminated when the when the distance to the stalled vehicle 3 calculated by the distance detector 18 is reduced to zero. That is, the positions of the vehicle 2 and the stalled vehicle 3 specified based on the positional information are reliable enough and the lag time of the communication between those vehicles are short, the distance or the period of time to execute the first notification may be adjusted directly instead of adjusting the distance or the period of time to execute the second notification.

What is claimed is:

1. A driver assist system that collects information about an obstacle located ahead of a vehicle, and that provides the information about the obstacle to a driver of the vehicle, comprising:
 a controller that controls a notification to the driver,
 wherein the controller comprises:
 a position detector that detects a position of the vehicle;
 an obstacle detector that detects a position of the obstacle;
 a distance detector that determines that the vehicle overtakes the obstacle based on the position of the vehicle detected by the position detector and the position of the obstacle detected by the obstacle detector; and
 an information provider that executes a first notification of existence of the obstacle until the distance detector determines that the vehicle overtakes the obstacle, and a second notification of the existence of the obstacle within an extra distance or for an extra period of time.

2. The driver assist system as claimed in claim 1,
wherein the controller further comprises an error detector that determines whether at least any one of an error of the position of the vehicle, an error of the position of the obstacle, and a lag time of communication between the vehicle and the obstacle is greater than a predetermined value, and the information provider is configured not to execute the second notification if the error of the position of the vehicle, the error of the position of the obstacle, and the lag time of communication between the vehicle and the obstacle are individually equal to or less than the predetermined values of those factors.

3. The driver assist system as claimed in claim 1, wherein the information provider is further configured to change contents of the notification between the first notification and the second notification.

4. The driver assist system as claimed in claim 2, wherein the information provider is further configured to change contents of the notification between the first notification and the second notification.

5. The driver assist system as claimed in claim 3, wherein the information provider is further configured to notify a distance from the vehicle to the obstacle during the first notification, and terminates notification of the distance from the vehicle to the obstacle during the second notification.

6. The driver assist system as claimed in claim 4, wherein the information provider is further configured to notify a distance from the vehicle to the obstacle during the first notification, and terminates notification of the distance from the vehicle to the obstacle during the second notification.

7. The driver assist system as claimed in claim 1, wherein the extra distance and the extra period of time are set in advance.

8. The driver assist system as claimed in claim 2, wherein the extra distance and the extra period of time are set in advance.

9. The driver assist system as claimed in claim 1,
wherein controller further comprises a running condition detector that detects a running condition of the vehicle, and the distance detector is configured to:
   calculate the distance from the vehicle to the obstacle based on the position of the vehicle detected by the position detector and the position of the obstacle detected by the obstacle detector, and an estimated time to arrive at the obstacle based on a current position of the vehicle, the distance from the vehicle to the obstacle, and a speed of the vehicle detected by the running condition detector; and determine that the vehicle overtakes the obstacle based on a fact that the distance from the vehicle to the obstacle is reduced to zero, or a fact that an elapsed time from a time point at which the existence of the obstacle was detected by the obstacle detector reaches the estimated time.

10. The driver assist system as claimed in claim 2,
wherein controller further comprises a running condition detector that detects a running condition of the vehicle, and the distance detector is configured to:
   calculate the distance from the vehicle to the obstacle based on the position of the vehicle detected by the position detector and the position of the obstacle detected by the obstacle detector, and an estimated time to arrive at the obstacle based on a current position of the vehicle, the distance from the vehicle to the obstacle, and a speed of the vehicle detected by the running condition detector; and determine that the vehicle overtakes the obstacle based on a fact that the distance from the vehicle to the obstacle is reduced to zero, or a fact that an elapsed time from a time point at which the existence of the obstacle was detected by the obstacle detector reaches the estimated time.

11. The driver assist system as claimed in claim 1,
wherein the obstacle includes a stalled vehicle, and
the vehicle comprises a stalled vehicle detector that detects the stalled vehicle based on information received from the stalled vehicle through an inter-vehicle communication.

12. The driver assist system as claimed in claim 2,
wherein the obstacle includes a stalled vehicle, and
the vehicle comprises a stalled vehicle detector that detects the stalled vehicle based on information received from the stalled vehicle through an inter-vehicle communication.

* * * * *